US009061501B2

(12) United States Patent
Zhang

(10) Patent No.: US 9,061,501 B2
(45) Date of Patent: Jun. 23, 2015

(54) MANUFACTURING METHOD OF LIQUID EJECTING HEAD

(71) Applicant: Seiko Epson Corporation, Tokyo (JP)

(72) Inventor: Junhua Zhang, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/224,019

(22) Filed: Mar. 24, 2014

(65) Prior Publication Data

US 2014/0291285 A1 Oct. 2, 2014

(30) Foreign Application Priority Data

Mar. 27, 2013 (JP) ................................ 2013-067310

(51) Int. Cl.
*G01D 15/00* (2006.01)
*B41J 2/16* (2006.01)
*B41J 2/14* (2006.01)

(52) U.S. Cl.
CPC ............ *B41J 2/1629* (2013.01); *B41J 2202/22* (2013.01); *B41J 2/161* (2013.01); *B41J 2/1623* (2013.01); *B41J 2/1628* (2013.01); *B41J 2/1632* (2013.01); *B41J 2/1634* (2013.01); *B41J 2002/14419* (2013.01)

(58) Field of Classification Search
CPC .. B41J 2/16505; B41J 2/1629; B41J 2/16502; H01L 41/09
USPC ............ 216/2, 27, 11, 17, 56, 16, 39, 40, 41, 216/99; 438/733, 745
See application file for complete search history.

(56) References Cited

U.S. PATENT DOCUMENTS

| | | | | |
|---|---|---|---|---|
| 6,557,967 | B1 * | 5/2003 | Lee | 347/20 |
| 2002/0118253 | A1 * | 8/2002 | Ohno et al. | 347/47 |
| 2002/0154191 | A1 * | 10/2002 | Kanda et al. | 347/47 |
| 2007/0212891 | A1 * | 9/2007 | Yamamuro et al. | 438/733 |

FOREIGN PATENT DOCUMENTS

JP 2006-159418 A 6/2006

* cited by examiner

*Primary Examiner* — Lan Vinh
(74) *Attorney, Agent, or Firm* — Kilpatrick Townsend & Stockton LLP

(57) ABSTRACT

Provided is a manufacturing method of a liquid ejecting head having a flow-path forming substrate in which a liquid flow path is provided to communicate with a nozzle opening through which liquid is discharged. The method includes performing wet etching on both surfaces of the flow-path forming substrate and forming the liquid flow path by removing a burr that is formed when the wet etching is performed on the flow-path forming substrate.

6 Claims, 4 Drawing Sheets

MANUFACTURING METHOD OF LIQUID EJECTING HEAD

This application claims priority to Japanese Patent Application No. 2013-067310, filed Mar. 27, 2013, the entirety of which is incorporated by reference herein.

BACKGROUND

1. Technical Field

The present invention relates to a manufacturing method of a liquid ejecting head which ejects liquid through nozzle openings and, particularly, relates to an ink jet type recording head which ejects ink as the liquid.

2. Related Art

An ink jet recording head which has a flow-path forming substrate in which a pressure generation chamber communicating with a nozzle opening is provided, a piezoelectric actuator which is fixed to one surface side of the flow-path forming substrate and causes a pressure change in the pressure generation chamber, and a manifold forming substrate which is fixed to the other surface side of the flow-path forming substrate and in which a manifold is formed to feed ink to each pressure generation chamber and a nozzle communication path is formed to allow the pressure generation chamber to communicate with the nozzle opening has been known as an example of the liquid ejecting head, for example (see JP-A-2006-159418, for example).

With the trend moving toward an increase in the number of nozzle openings and an increase in the amount of discharged ink, it is necessary for the above-described ink jet type recording head to have a manifold of which a flow-path resistance is reduced.

Thickening a substrate having the manifold formed therein can be achieved by laminating a plurality of substrates. However, the number of parts is increased and a process for joining the substrates to each other is required, and thus there is a problem in that cost is increased. Furthermore, in a case where the plurality of substrates are laminated, there is a possibility that the substrates may be separated from each other. Thus, there is a problem in that reliability is lowered.

SUMMARY

An advantage of some aspects of the invention is to provide a manufacturing method of a liquid ejecting head in which a liquid flow path is formed in a relatively thick flow-path forming member.

According to an aspect of the invention, there is provided a manufacturing method of a liquid ejecting head having a flow-path forming substrate in which a liquid flow path is provided to communicate with a nozzle opening through which liquid is discharged, the method including performing wet etching on both surfaces of the flow-path forming substrate, and forming the liquid flow path by removing a burr that is formed when the wet etching is performed on the flow-path forming substrate.

In this case, it is possible to process a plurality of the flow-path forming substrates in a short time and at a low cost, by wet etching. In addition, the burr that is formed when the wet etching is performed is removed, and thus a flow-path resistance of the liquid flow path is prevented from increasing. Thus, it is not necessary to widen an opening of the liquid flow path, and thus it is possible to prevent the flow-path forming substrate from increasing in size. Furthermore, the burr is removed, and thus it is possible to prevent liquiddroplet discharging failure from occurring due to foreign matter, such as an air bubble and dust, trapped by the burr.

It is preferable that the flow-path forming substrate have a nozzle communication path that allows a pressure generation chamber to communicate with the nozzle opening and a manifold that feeds liquid to the pressure generation chamber and, at the least, the burr formed on a wall surface which forms the nozzle communication path be removed in the forming of the liquid flow path. In this case, even when the flow-path forming substrate is constituted by a thick plate to reduce the flow-path resistance of the manifold, it is possible to easily form the nozzle communication path in which the burr is removed.

It is preferable that the burr formed on a wall surface which forms the manifold be removed in the forming of the liquid flow path. In this case, it is possible to prevent foreign matter from being trapped by the burr formed in the manifold.

It is preferable that the burr be removed by laser processing, punching, or dry etching in the forming of the liquid flow path. In this case, it is possible to easily and reliably remove the burr.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, details of embodiments of the invention will be described.

Embodiment 1

Figure 1:
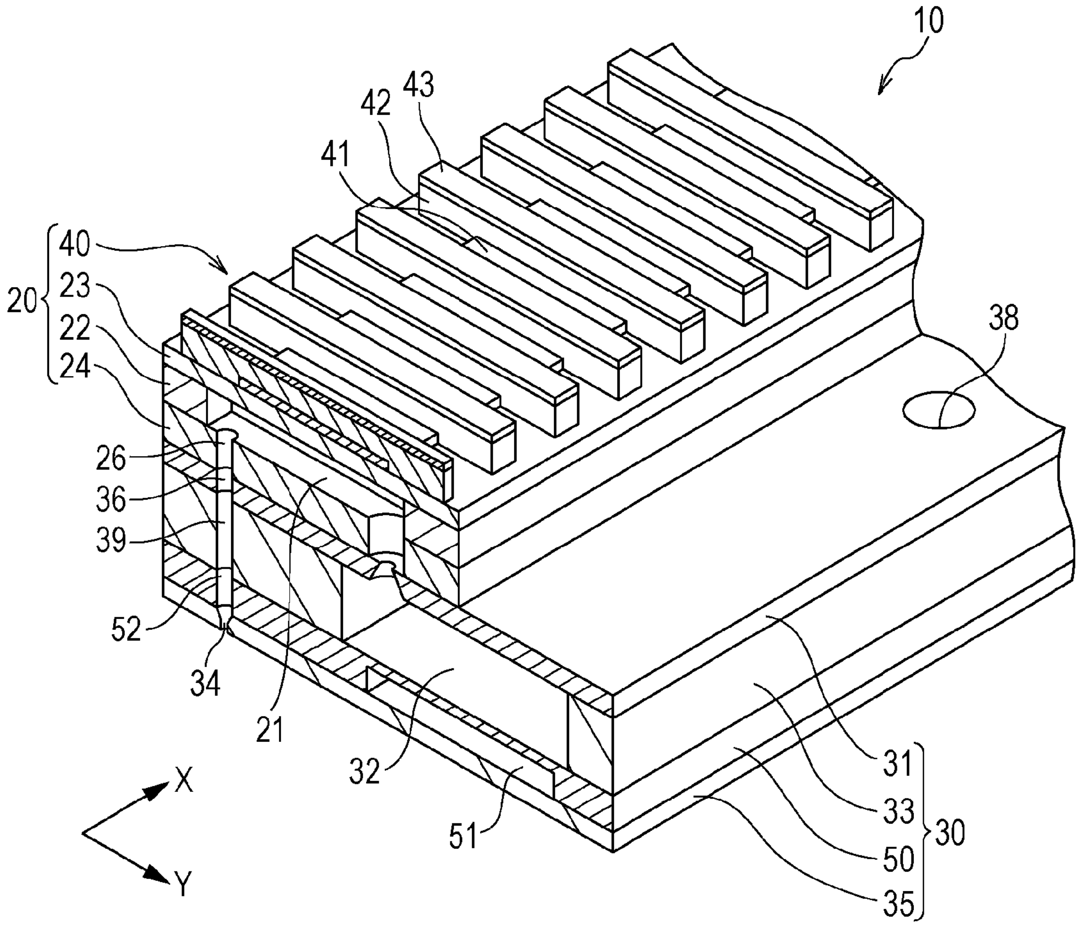
FIG. 1 is a perspective view of a recording head according to Embodiment 1 of the invention.
Figure 2A:
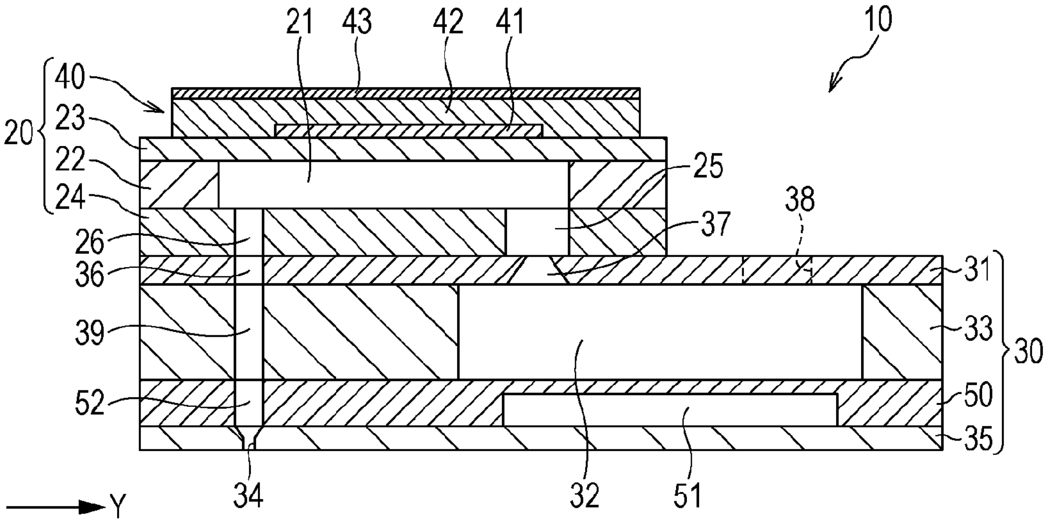
FIGS. 2A and 2B are a cross-sectional view and an enlarged cross-sectional view of the recording head according to Embodiment 1 of the invention.
Figure 2B:
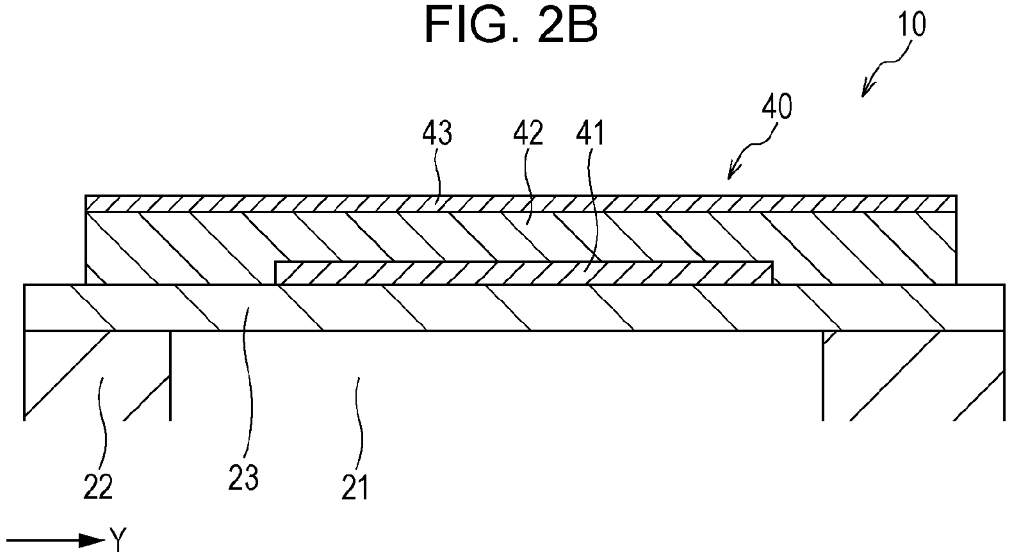

FIG. 1 is a perspective view of an ink jet type recording head as an example of a liquid ejecting head according to Embodiment 1 of the invention. FIGS. 2A and 2B are a cross-sectional view of the ink jet type recording head and an enlarged cross-sectional view of principal portions thereof.

An ink jet type recording head 10 according to Embodiment 1 is provided with an actuator unit 20 and a flow-path unit 30 to which the actuator unit 20 is fixed, as illustrated in the accompanying drawings.

The actuator unit 20 is an actuator device provided with a piezoelectric actuator 40 as a pressure generation unit. The actuator unit 20 includes a flow-path forming substrate 22 which is a flow-path forming substrate having a pressure generation chamber 21 formed therein, a diaphragm 23 which is provided on one surface side of the flow-path forming substrate 22, and a pressure generation chamber base plate 24 which is provided on the other surface side of the flow-path forming substrate 22.

Examples of materials forming the flow-path forming substrate 22 include ceramic material, such as alumina ($Al_2O_3$) and zirconia ($ZrO_2$); an inorganic film, such as oxide silicon; and metallic material, such as stainless steel (SUS). In this embodiment, a plurality of the pressure generation chambers 21 are aligned along a direction in which a plurality of nozzle openings are aligned to discharge ink of the same color. Hereinafter, this direction will be referred to as a first direction X of the pressure generation chamber 21. In addition, a direction which is perpendicular to the first direction X in a plane of the flow-path forming substrate 22, in which the diaphragm 23 is provided, hereinafter will be referred to as a second direction Y.

The diaphragm 23 is fixed to one surface of the flow-path forming substrate 22, and one surface of the pressure generation chamber 21 is sealed by the diaphragm 23.

The pressure generation chamber base plate 24 is fixed to the other surface side of the flow-path forming substrate 22 and seals the other surface of the pressure generation chamber 21. The pressure generation chamber base plate 24 has a feeding communication path 25 and a nozzle communication path 26. The feeding communication path 25 is provided in a vicinity of one end portion of the pressure generation chamber 21 in the second direction Y and allows the pressure generation chamber 21 to communicate with a manifold 32, described below. The nozzle communication path 26 described below is provided in a vicinity of the other end portion of the pressure generation chamber 21 in the second direction Y and communicates with a nozzle opening 34. In other words, the feeding communication path 25, the pressure generation chamber 21, and the nozzle communication path 26 are provided in the actuator unit 20, as a liquid flow path.

Each piezoelectric actuator 40 is respectively provided in a portion on the diaphragm 23, which is opposite each pressure generation chamber 21.

In this case, each piezoelectric actuator 40 of Embodiment 1 is provided with a first electrode 41 which is provided on the diaphragm 23, a piezoelectric layer 42 which is individually provided for each pressure generation chamber 21, and a second electrode 43 which is provided on each piezoelectric layer 42.

In Embodiment 1, the first electrode 41 continuously extends over the pressure generation chambers 21 which are aligned in the first direction X and forms a common electrode of a plurality of the piezoelectric actuators 40. In addition, the first electrode 41 also functions as a part of a diaphragm. Needless to say, the first electrode 41 may be provided for each piezoelectric layer 42.

The piezoelectric layers 42 are separated such that each piezoelectric layer 42 corresponds to each pressure generation chamber 21. Needless to say, the piezoelectric layer 42 may continuously extend over a plurality of the pressure generation chambers 21, as similar to the first electrode 41.

The second electrode 43 is separately provided for each piezoelectric layer 42 and forms an individual electrode of each piezoelectric actuator 40. In Embodiment 1, the first electrode 41 is the common electrode of the plurality of piezoelectric actuators 40 and the second electrode 43 is the individual electrode of the piezoelectric actuator 40. However, there is no problem even in a case where the common electrode and the individual electrodes are switched each other for a driving circuit configuration or a wiring configuration.

When the flow-path forming substrate 22 and the pressure generation chamber base plate 24 of the actuator unit 20 are formed of, for example, a ceramic material, a clayey ceramic material, that is, a so-called green sheet, they are molded to have a predetermined thickness. Next, the flow-path forming substrate 22 and the pressure generation chamber base plate 24 are cut to form the pressure generation chamber 21 or the like, and then are subjected to firing in a laminated state. Therefore, the flow-path forming substrate 22 and the pressure generation chamber base plate 24 are integrated without using an adhesive agent. Subsequently, the diaphragm 23 and the piezoelectric actuator 40 are formed. When the diaphragm 23 is formed of a ceramic material, as similar to the flow-path forming substrate 22, the flow-path forming substrate 22, the diaphragm 23, and the pressure generation chamber base plate 24 can be joined to each other without using an adhesive agent, by following a procedure described below. First, a clayey ceramic material is molded, and then the molded members are cut to form the pressure generation chamber 21 or the like. Next, these members are subjected to firing in a laminated state. Furthermore, when the flow-path forming substrate 22, pressure generation chamber base plate 24 and the like are formed of a material other than the ceramic material, such as a metallic material, these members may be joined by using an adhesive agent or a thermal welding film or may be integrated in such a manner that the members are directly joined by using a method, such as thermocompression bonding between metallic members.

Meanwhile, the flow-path unit 30 is constituted by a liquid feeding port forming substrate 31 which is joined to the pressure generation chamber base plate 24 of the actuator unit 20, a manifold forming substrate 33 in which the manifold 32 is formed to function as a common ink chamber of the plurality of pressure generation chambers 21, a compliance substrate 50 provided on a surface of the manifold forming substrate 33, which is located on a side opposite the liquid feeding port forming substrate 31, and a nozzle plate 35 on which the nozzle openings 34 are formed.

A nozzle communication path 36 which connects the nozzle opening 34 and the pressure generation chamber 21 and an ink feeding port 37, along with the feeding communication path 25, which connects the manifold 32 and the pressure generation chamber 21, are bored in the liquid feeding port forming substrate 31. In addition, an ink inlet port 38 which communicates with each manifold 32 is formed in the liquid feeding port forming substrate 31 to feed the ink from an external ink tank.

The manifold forming substrate 33 of Embodiment 1 is constituted by a plate member which is formed of a corrosion-resistance metallic material, such as stainless steel (SUS), suitable to form a liquid flow path. The manifold forming substrate 33 includes the manifold 32 and a nozzle communication path 39 which allows the pressure generation chamber 21 to communicate with the nozzle openings 34. The manifold 32 receives the ink from the external ink tank (not illustrated) and feeds the ink to the pressure generation chamber 21.

The compliance substrate 50 is joined to a surface of the manifold forming substrate 33, which is located on a side opposite the liquid feeding port forming substrate 31, and thus the compliance substrate 50 seals a base surface of the manifold 32. In addition, a part of the compliance substrate 50, which is opposite the manifold 32, is formed to be thinner than the other part of the compliance substrate 50. Thus, this part forms a compliance portion 51 which is deformed when a pressure in the manifold 32 is changed.

Furthermore, a nozzle communication path 52 is formed in the compliance substrate 50 to allow the nozzle communication path 39, which is formed in the manifold forming substrate 33 to pass through the substrate in a thickness direction, to communicate with the nozzle opening 34. In other words, the ink from the pressure generation chamber 21 passes through nozzle communication paths 36, 39, and 52 which are formed in the liquid feeding port forming substrate 31, the manifold forming substrate 33, and the compliance substrate 50 and is discharged through the nozzle opening 34.

The nozzle openings 34 are bored on the nozzle plate 35 to be in rows by the same pitch (in the first direction X) as the pressure generation chambers 21. In addition, the nozzle plate 35 is joined to a surface of the compliance substrate 50, which is located on a side opposite the flow-path forming substrate 22.

The flow-path unit 30 described above is constituted by the liquid feeding port forming substrate 31, the manifold forming substrate 33, the compliance substrate 50, and the nozzle plate 35 which are fixed to each other by an adhesive agent, a thermal welding film, or the like. In Embodiment 1, the manifold 32, the nozzle communication paths 39 and 52, and the nozzle openings 34 are formed in the flow-path unit 30, as a liquid flow path.

The flow-path unit 30 described above and the actuator unit 20 are joined and fixed to each other by an adhesive agent or a thermal welding film.

In the ink jet type recording head 10 configured as above, the ink is fed from a storage unit, such as an ink cartridge, in which the ink is stored, into the manifold 32 through the ink inlet port 38. Thus, the liquid flow path which runs from the manifold 32 to the nozzle opening 34 is filled with the ink, and then a recording signal from a driving circuit (not illustrated) is transmitted to the piezoelectric actuator 40. Therefore, voltage is applied to each piezoelectric actuator 40 corresponding to each pressure generation chamber 21, and thus the diaphragm 23 is flexibly deformed along with the piezoelectric actuator 40. As a result, a pressure in each pressure generation chamber 21 increases, and thus ink droplets are ejected through the respective nozzle openings 34.

Figure 3A:
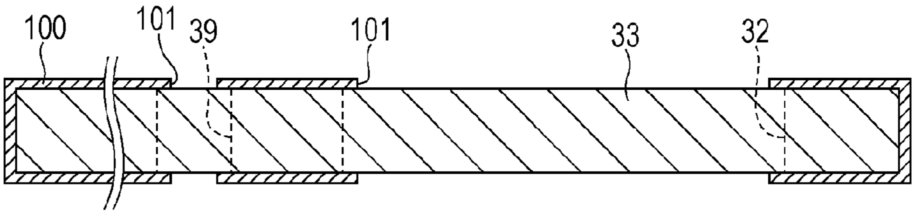
FIGS. 3A to 3C are cross-sectional views for illustrating a manufacturing method of the recording head according to Embodiment 1 of the invention.
Figure 3B:
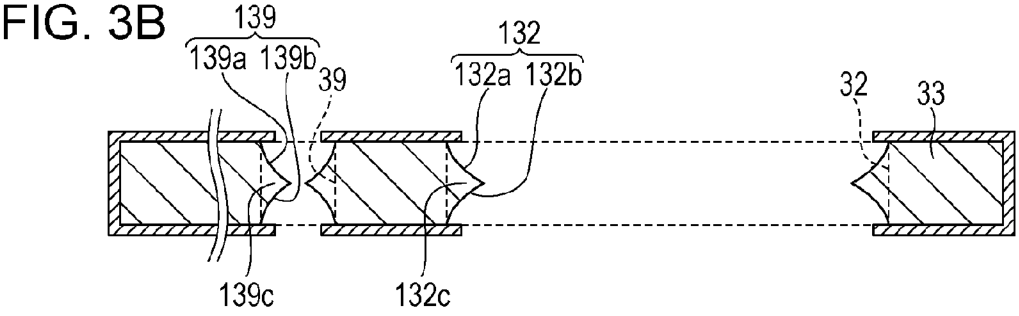
Figure 3C:
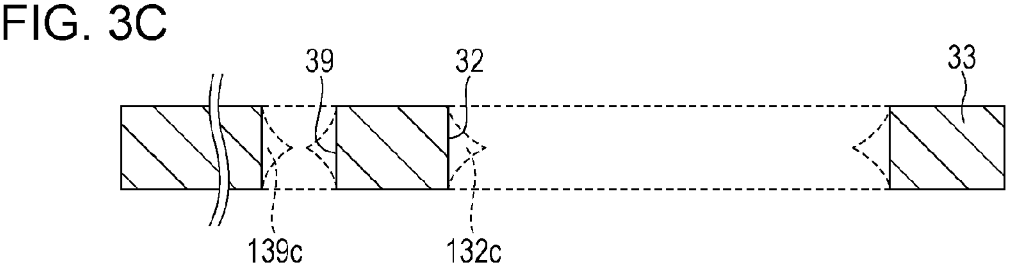

Here, details of a manufacturing method of the ink jet type recording head 10 configured as above, particularly, a manufacturing method of the manifold forming substrate 33 will be described with reference to FIGS. 3A to 3C. FIGS. 3A to 3C are cross-sectional views for illustrating a manufacturing method of the ink jet type recording head as an example of a liquid ejecting head according to Embodiment 1 of the invention.

First, a mask 100 constituted by a metal plate is formed on a surface of the manifold forming substrate 33, as illustrated in FIG. 3A. Opening portions 101 are formed in portions of the mask 100, which correspond to positions at which the nozzle communication path 39 and the manifold 32 are formed. In addition, the opening portions 101 are provided on both surfaces of the manifold forming substrate 33 in a laminating direction. A size of the opening portion 101 is slightly smaller than the portion in which the nozzle communication path 39 or the manifold 32 is formed.

Next, both surfaces of the manifold forming substrate 33 are subjected to wet etching (a first step), as illustrated in FIG. 3B. Therefore, the portion of the manifold forming substrate 33, which is exposed through the opening portion 101, is gradually removed from a surface side. In Embodiment 1, a first through-hole 139 constituted by a first concave portion 139*a* and a second concave portion 139*b* is formed in the portion in which the nozzle communication path 39 is formed, corresponding to the opening portions 101. The first concave portion 139*a* passes through the substrate from one surface side and the second concave portion 139*b* passes through the substrate from the other surface side. In addition, a second through-hole 132 constituted by a third concave portion 132*a* and a fourth concave portion 132*b* is formed in the portion in which the manifold 32 is formed, corresponding to the opening portions 101. The third concave portion 132*a* passes through the substrate from one surface side and the fourth concave portion 132*b* passes through the substrate from the other surface side. Wet etching can be performed in such a manner that the manifold forming substrate 33 is immersed in the etchant or the etchant is ejected onto the manifold forming substrate 33. In other words, the manifold forming substrate 33 is subjected to wet etching in a second step, and thus a plurality of the manifold forming substrates 33 can be subjected to wet etching at the same time, by using a batch processing method. Thus, upon comparison with a case where the nozzle communication path 39 or the manifold 32 is formed in the manifold forming substrates 33 one by one, by laser processing, dry etching, or machining, it is possible to perform processing in a short time and at a low cost. In the case of the laser processing, it is difficult to form through-holes of which opening sizes are the same in a penetrating direction and the shape of the through-hole is tapered. Thus, it is difficult to form the nozzle communication path 39 with high precision.

When the manifold forming substrate 33 is subjected to wet etching, widths of base surface sides of the first concave portion 139*a*, the second concave portion 139*b*, the third concave portion 132*a*, and the fourth concave portion 132*b* (hereinafter, these are referred to as concave portions) are smaller than widths of opening potion 101 sides thereof Thus, when both surfaces of the manifold forming substrate 33 is subjected to wet etching, a burr is formed in a portion penetrated by the base surfaces of the concave portions which are respectively opened to both surfaces of the substrate. The burr protrudes from a side wall to a center portion side. Hereinafter, a burr formed in the first through-hole 139 is set to be a first burr 139*c* and a burr formed in the second through-hole 132 is set to be a second burr 132*c*. Further, both of these, first burr 139*c* and second burr 132*c*, are referred to as burrs. Generally, a protrusion amount of the burr which is formed in the first through-hole 139 or the second through-hole 132 is set to be in a range of about 10% and 15% of a thickness of a substrate (the manifold forming substrate 33, in Embodiment 1) subjected to processing.

In a case where a thickness of the manifold forming substrate 33 is set to be 400 μm and an opening width of the nozzle communication path 39 opened to the surface of the manifold forming substrate 33 is set to be 150 μm, the first burr 139*c* protrudes from an opening edge on the surface, by as much as the range of about 40 μm and 60 μm. The first burr 139*c* is formed over an inner wall surface. An opening width at a position at which the first burr 139*c* protrudes most is set to be in a range of 30 μm and 70 μm. That is, in the case of the nozzle communication path 39 of which an opening width is relatively small, when the manifold forming substrate 33 is constituted by a thick plate, there is a problem in that the burr narrows a flow path.

Subsequently, the first burr 139*c* formed in, at least, the first through-hole 139 which forms the nozzle communication path 39 is removed, and thus the nozzle communication path 39 is formed (the second step), as illustrated in FIG. 3C. In Embodiment 1, the second burr 132*c* formed in the second through-hole 132 which forms the manifold 32 is removed, in addition to the first through-hole 139, and thus the manifold 32 is formed.

In this case, a burr removing method in the second step is not particularly limited. Laser processing, blast processing represented by sand blasting, machining using a punching machine, or dry machining, such as dry etching, can be applied as a burr removing method, for example. Furthermore, the nozzle communication path 39 and the manifold 32 can be directly formed, without being subjected to wet etching, by the burr removing method. In this case, however, time is necessary for processing the substrates one by one, compared to the wet etching. Accordingly, it is difficult to perform batch processing, and thus the cost increases. In Embodiment 1, a plurality of manifold forming substrates 33 are subjected to wet etching in a batch processing manner, and thus the first through-hole 139 and the second through-hole 132 which form the nozzle communication path 39 and the manifold 32 are formed (the first step). Then, the burrs (the first burr 139*c* and the second burr 132*c*) formed in the first through-hole 139 and the second through-hole 132 are removed in the second step. Laser processing, machining, blast processing, dry machining, or the like is applied only in the second step, and thus it is possible to perform processing in a short time and at a low cost. The burr may be removed by any one of the following, laser processing, machining, blast processing, dry machining and the like, or may be removed by combining the most suitable processing methods. That is, processing, such as wet etching, capable of cutting a wide range of the substrate in a short time is performed, and then processing, such as laser processing, machining, blast processing, and dry machining, which requires a longer time but the processing accuracy is superior or processing which ensures a clean finished surface may be performed. In addition, the burr removing method is not limited to a burr cutting method but also includes a punching method.

As described above, the first through-hole 139 and the second through-hole 132 are formed in the manifold forming substrate 33 by using wet etching, and then the burrs (the first burr 139*c* and the second burr 132*c*) formed in the first through-hole 139 and the second through-hole 132 is removed to form the nozzle communication path 39 and the manifold 32. Thus, it is possible to reduce the cost by reducing the processing time.

Furthermore, the burr is removed, and thus it is possible to prevent the opening size of the nozzle communication path 39 or the manifold 32, which is located on the surface side of the manifold forming substrate 33, from differing from the opening size in the middle thereof in the thickness direction. Thus, a flow-path resistance is prevented from increasing. Also, the manifold forming substrate 33 is prevented from increasing in size, and thus it is possible to realize a compact manifold forming substrate 33.

That is, in a case where the first through-hole 139 in which the first burr 139*c* is formed as it is used as the nozzle communication path 39, an opening width of the nozzle communication path 39 on the surface side of the manifold forming substrate 33 is 150 μm. However, the protrusion amount of the burr is set to be in a range of about 10% and 15% of the thickness of the substrate. Accordingly, an opening width in the middle of the flow path narrows, by at least 30 μm, that is, the opening width is about 70 μm, in the penetrating direction. Thus, the flow-path resistance increases in this narrowing portion. When setting an opening width of a portion narrowed by the first burr 139*c* to be 150 μm to prevent an increase in flow-path resistance, it is necessary to preset an opening width of the nozzle communication path 39 on the surface side of the manifold forming substrate 33 to be great, that is, the opening width on the surface side is set to be in a range of 230 μm and 270 μm. Thus, it is necessary to increase the size of the manifold forming substrate 33 as much as an amount of the increased opening width of the nozzle communication path 39 on the surface side of the manifold forming substrate 33.

Therefore, the manifold forming substrate 33 increases in size. In the case of Embodiment 1, the burr is removed, and thus the flow-path resistance of the nozzle communication path 39 is prevented from increasing. Accordingly, it is possible to ensure the minimum size of the nozzle communication path 39, and thus it is possible to achieve the compact manifold forming substrate 33.

Particularly, in the case of a thorough-hole having a small opening size, that is, the nozzle communication path 39 in Embodiment 1, when the first burr 139*c* is formed in the path, foreign matter, such as an air bubble and dust, is trapped by the first burr 139*c* in the nozzle communication path 39. In Embodiment 1, the first burr 139*c* in the first through-hole 139 is removed to form the nozzle communication path 39, and thus the foreign matter, such as an air bubble and dust, is prevented from being trapped in the middle of the nozzle communication path 39. Thus, it is possible to prevent ink-droplet discharging failure from occurring.

In Embodiment 1, the burrs (the first burr 139*c* and the second burr 132*c*) in the first through-hole 139 and the second through-hole 132 in the manifold forming substrate 33 are removed to form the nozzle communication path 39 and the manifold 32. However, there is no problem in a case where the burr in, at least, the nozzle communication path 39 (the first through-hole 139) having a small opening size is removed. That is, even when the second burr 132*c* is formed on a wall surface of the manifold 32, it is difficult to greatly influence a flow capacity thereof because the opening size of the manifold 32 is great. Accordingly, when the second burr 132*c* remains on the wall surface of the manifold 32, the foreign matter, such as an air bubble or dust, is likely to be trapped. Thus, there is possibility that the trapped air bubble may grow and flow into the pressure generation chamber 21 at an unexpected time, and thus failure, such as ink-droplet discharging failure, may be caused. However, when the second burr 132*c* in the manifold 32 (the second through-hole 132) is removed as described in Embodiment 1, the foreign matter, such as an air bubble and dust, is prevented from being trapped. As a result, it is possible to prevent ink-droplet discharging failure from occurring.

Then, the compliance substrate 50, the liquid feeding port forming substrate 31, the nozzle plate 35, and the like are joined to the manifold forming substrate 33, and thus the flow-path unit 30 can be formed.

In addition, the flow-path unit 30 is joined to the actuator unit 20 to form the ink jet type recording head 10 of Embodiment 1.

The manufacturing of the manifold forming substrate 33 is described in Embodiment 1. However, without being limited to the manifold forming substrate 33, when other substrates, such as the compliance substrate 50 and the liquid feeding port forming substrate 31, are manufactured through the similar manufacturing steps, substrates may be manufactured through the first step and the second step described above. Needless to say, substrates, that are, the flow-path forming substrate 22, the pressure generation chamber base plate 24, and the like, which constitute the actuator unit 20 may be manufactured through steps including the first step and the second step described above.

Other Embodiments

Hereinbefore, an embodiment of the invention is described. However, the basic configuration of the invention is not limited thereto. The following modification examples can be applied by alone or in a combination.

For example, a plate member formed of a metallic material is exemplified as the manifold forming substrate 33 in Embodiment 1 described above. However, the material forming the manifold forming substrate 33 is not limited to a metallic material as long as a burr is formed in the material when the material is subjected to wet etching from both surface sides thereof. Examples of the material include glass and a semiconductor.

Figure 4:
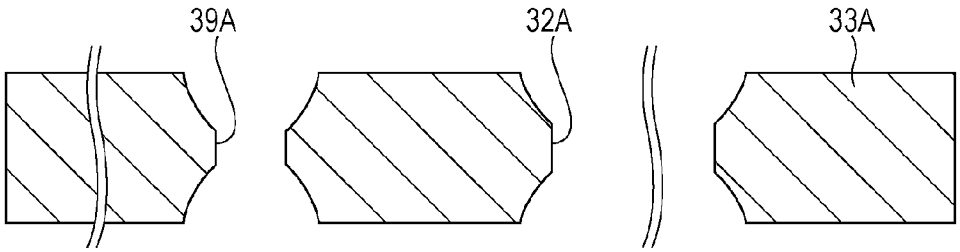
FIG. 4 is a cross-sectional view of a manifold forming substrate according to another embodiment of the invention.

In addition, the burrs (the first burr 139*c* and the second burr 132*c*) formed in the first through-hole 139 and the second through-hole 132 are completely removed in Embodiment 1 described above, for example. However, without being limited thereto, only parts of the burrs may be removed. The example described above is illustrated in FIG. 4. FIG. 4 is a cross-sectional view of a manifold forming substrate according to another embodiment.

A nozzle communication path 39A and a manifold 32A are formed in a manifold forming substrate 33A to pass through the substrate in the thickness direction (a laminating direction between the substrate and the other substrate), as illustrated in FIG. 4. The nozzle communication path 39A and the manifold 32A are formed in a shape in which parts of the burrs remain such that the opening sizes thereof gradually narrow from surface sides to middle portions in the thickness direction. Even in this configuration, it is possible to form the nozzle communication path 39A and the manifold 32A in a short time and at a low cost by applying the similar manufacturing method as that in Embodiment 1. In addition, it is possible to prevent foreign matter, such as an air bubble and dust, from being trapped in a flow path while preventing the manifold forming substrate 33A from increasing in size. In other words, burr removal includes complete and partial removal of the burr.

Figure 5:
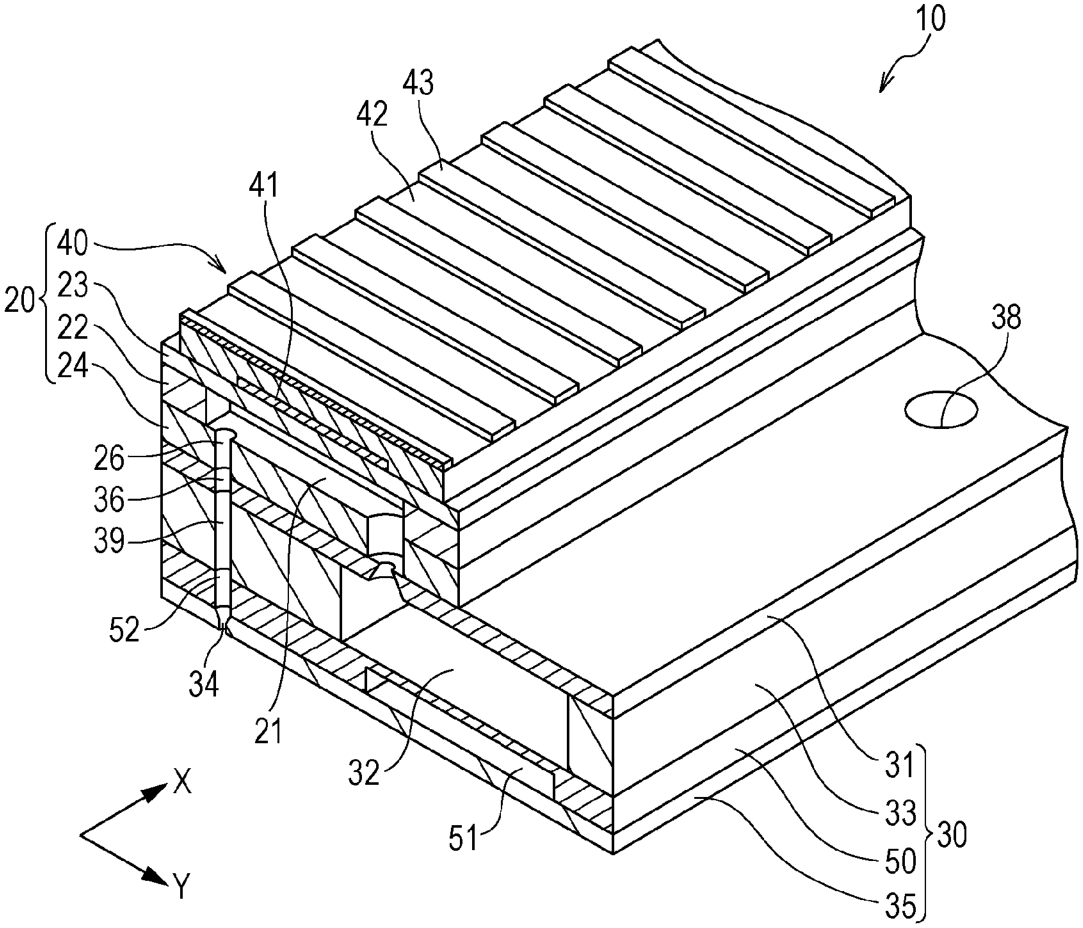
FIG. 5 is a perspective view of a recording head according to another embodiment of the invention.

Furthermore, in the description of Embodiment 1 described above, a configuration in which the piezoelectric layers 42 are separated such that each piezoelectric layer 42 corresponds to each pressure generation chamber 21 (each piezoelectric actuator 40) is exemplified. However, the configuration is not particularly limited thereto and the piezoelectric layers 42 may continuously extend over a plurality of the pressure generation chambers 21 (the piezoelectric actuators 40), as illustrated in FIG. 5. FIG. 5 is a perspective view of an ink jet type recording head as an example of a liquid ejecting head according to another embodiment of the invention.

Furthermore, in Embodiment 1 described above, the first through-hole 139 is formed by first concave portion 139*a* and the second concave portion 139*b* of which the base surfaces pass through the substrate, and then the first burr 139*c* is removed to form the nozzle communication path 39. However, without being limited thereto, the first concave portion 139*a* and the second concave portion 139*b* may not pass through the substrate. In other words, a wall may remain in a portion between the base surfaces of the first concave portion 139*a* and the second concave portion 139*b*. Even when the wall remains as described above, it is possible to form the first through-hole 139 passing through the substrate and to remove the first burr 139*c*, at the same time in the second step. This is also common to the second through-hole 132 which forms the manifold 32.

In the description of Embodiment 1, the piezoelectric actuator is used as a pressure generation unit for changing the pressure in the pressure generation chamber 21. However, the type of the piezoelectric actuator is not particularly limited. A thick-film type piezoelectric actuator which is formed by, for example, a greensheet-paste method, a thin-film type piezoelectric actuator which is formed by laminating an electrode and a piezoelectric material using a film forming method and a lithography method, or a longitudinal-oscillation type piezoelectric actuator which is formed by laminating a piezoelectric material and an electrode forming material on each other and which expands and contracts in an axial direction can be used as the pressure generation unit, for example. Furthermore, a unit in which a heater element is provided in a pressure generation chamber and which causes liquid droplets to be discharged through nozzle openings by using bubbles generated by the heating of the heater element or a so-called electrostatic actuator in which static electricity is generated between a diaphragm and an electrode and which causes the diaphragm to be deformed by the electrostatic force, and thus liquid droplets are discharged through nozzle openings can be used as the pressure generation unit, for example.

In Embodiment 1 described above, the manufacturing method of the ink jet type recording head is used as an example of the liquid ejecting head. However, the invention is intended to be applied to general kinds of liquid ejecting head manufacturing methods. The invention can also be applied to a manufacturing method of a liquid ejecting head which ejects liquid other than ink. Other examples of the liquid ejecting head include various types of recording heads which are applied to image recording apparatuses, such as a printer, a coloring material ejecting head used to manufacture a color filter for a liquid crystal display or the like, an electrode material ejecting head used to form an electrode for an organic EL display, a field emission display (FED) or the like, a bio-organic material ejecting head used to manufacture a biochip, or the like. The invention can be applied to the manufacturing method of the liquid ejecting head described above.

What is claimed is:

1. A manufacturing method of a liquid ejecting head having a flow-path forming substrate in which a liquid flow path is provided to communicate with a nozzle opening through which liquid is discharged, the flow-path forming substrate having a first surface opposite a second surface, the method comprising:

masking the first surface with a first mask layer, the first mask layer having at least one opening;

masking the second surface with a second mask layer, the second mask layer having at least one opening corresponding to the at least one opening of the first mask layer;

performing wet etching on the first surface and the second surface of the flow-path forming substrate so as to form an opening between the first surface and the second surface, wherein the wet etching on the first surface and the second surface of the flow-path forming substrate results in a burr protruding inwardly from a side of the opening of the flow-path forming substrate after the completion of the wet etching of the flow-path forming substrate; and, after completion of the wet etching of the flow-path forming substrate, forming the liquid flow path by removing the burr that is formed after the wet etching is completed on the flow-path forming substrate.

2. The manufacturing method of a liquid ejecting head according to claim 1, wherein the flow-path forming substrate has a nozzle communication path that allows a pressure generation chamber to communicate with the nozzle opening and a manifold that feeds the liquid to the pressure generation chamber, and wherein the burr formed on, at least, a wall surface which forms the nozzle communication path is removed in the forming of the liquid flow path.

3. The manufacturing method of a liquid ejecting head according to claim 2, wherein the burr formed on a wall surface which forms the manifold is removed in the forming of the liquid flow path.

4. The manufacturing method of a liquid ejecting head according to claim 1, wherein the burr is removed by laser processing in the forming of the liquid flow path.

5. The manufacturing method of a liquid ejecting head according to claim 1, wherein the burr is removed by punching in the forming of the liquid flow path.

6. The manufacturing method of a liquid ejecting head according to claim 1, wherein the burr is removed by dry etching in the forming of the liquid flow path.

* * * * *